United States Patent
Wu

(10) Patent No.: US 6,837,483 B2
(45) Date of Patent: Jan. 4, 2005

(54) GATE VALVE ASSEMBLY

(75) Inventor: Wei-Yueh Wu, No. 6-2,
Bin-Lang-Shu-Chiao, Chung-Ho Tsun,
Shui-Shang Hsiang, Chia-Yi Hsien
(TW)

(73) Assignee: Wei-Yueh Wu, Chia-Yi Hsien (TW)

( * ) Notice: Subject to any disclaimer, the term of this patent is extended or adjusted under 35 U.S.C. 154(b) by 112 days.

(21) Appl. No.: 10/249,175

(22) Filed: Mar. 20, 2003

(65) Prior Publication Data

US 2004/0089836 A1 May 13, 2004

(30) Foreign Application Priority Data

Nov. 7, 2002 (TW) .......................................... 91132828 A

(51) Int. Cl.$^7$ ................................................. F16K 3/22
(52) U.S. Cl. ...................................... 251/328; 251/314
(58) Field of Search ................................ 251/326–329, 251/333–334, 314–317.01, 305–308, 356–367

(56) References Cited

U.S. PATENT DOCUMENTS

| 5,037,067 A | * | 8/1991 | Ray | ............................ 251/314 |
| 5,579,718 A | * | 12/1996 | Freerks | ........................ 118/733 |
| 6,685,163 B2 | * | 2/2004 | Blecha | ........................ 251/328 |

* cited by examiner

Primary Examiner—Paul J. Hirsch
(74) Attorney, Agent, or Firm—Winston Hsu

(57) ABSTRACT

A gate valve assembly includes a valve seat and a valve. The valve seat includes a passage opening and a contacting region surrounding the passage opening. The valve includes a groove located on a marginal region of the valve, and a sealing body positioned in the groove. The passage opening is closed by covering the valve over the valve seat, and an upper surface of the sealing body is tightly contacted with the contacting region. Therefore, the valve is prevented from rubbing against the valve seat and producing particles.

21 Claims, 15 Drawing Sheets

GATE VALVE ASSEMBLY

BACKGROUND OF INVENTION

1. Field of the Invention

The present invention relates to a covered-type gate valve assembly, and more particularly, to a covered-type gate valve assembly for opening or closing a vacuum chamber.

2. Description of the Prior Art

Generally, a gate valve assembly is widely applied on various kinds, of equipment, such as a stop valve used in water conduits, a discharge valve used in motorcycle's engines, and so on. Additionally, the gate valve assembly is also usually used in semiconductor apparatuses such as an etcher and a chemical vapor deposition apparatus.

Please refer to FIG. 1. FIG. 1 is a schematic diagram of a chemical vapor deposition (CVD) apparatus. As shown in FIG. 1, a CVD apparatus 10 comprises two load chambers 12 for carrying a wafer in or out of the CVD apparatus 10, a substrate-transferring chamber 14, and four reaction chambers 16 for performing a chemical vapor deposition process on the wafer, such as depositing a dielectric layer on the wafer. Additionally, the substrate-transferring chamber 14 functions as a buffer space for allowing the wafer to be transferred from one chamber to the other. Furthermore, the substrate-transferring chamber 14 includes a substrate-transferring device 18 at least comprising a robot and a stage for transferring the wafer.

The CVD apparatus 10 further comprises a plurality of gate valve assemblies 20. Each gate valve assembly 20 is located between each of the load chambers 12 and the substrate-transferring chamber 14, and between each of the reaction chambers 16 and the substrate-transferring chamber 14. Furthermore, each gate valve assembly 20 functions to open or close the chambers. Noticeably, the pressure of the substrate-transferring chamber 14 or each of the reaction chambers 16 is extremely low, and further, is close to a vacuum. Therefore, each gate valve assembly 20 must be provided with an excellent airtightness so as to maintain a vacuum level of each chamber.

Please refer to FIG. 2 to FIG. 5. FIG. 2 is a schematic diagram of a prior art gate valve assembly. FIG. 3 is a cross-sectional view along line 3—3 of FIG. 2. FIG. 4 is a perspective view of the gate valve assembly shown in FIG. 2. FIG. 5 is a cross-sectional view along line 5—5 of FIG. 4. As shown in FIG. 2, a gate valve assembly 20 comprises a valve seat 22 and a valve 30. Additionally, the valve seat 22 comprises a passage opening 24 for allowing the wafer to pass in and out of each chamber, and a plurality of metal sheets 28 located on the bottom of the passage opening 24.

Referring to FIG. 3, the valve 30 comprises a first surface 30a facing the passage opening 24 and a second surface 30b. Moreover, as shown in FIG. 4, the valve 30 comprises a groove 32 surrounding a rim of the first surface 30a, and an O-ring 34 positioned in the groove 32. As shown in FIG. 5, the O-ring 34 has an approximately round cross-section so that the O-ring 34 frequently drops from the groove 32. Accordingly, for tightly fixing the O-ring 34 in the groove 32, the valve 30 further includes polymer glue 36 for filling a gap between the O-ring 34 and sidewalls of the groove 32.

Referring to FIG. 3, the operation manner will be explained as follows. As shown in FIG. 3, a double arrow AA" indicates a sliding direction along which the valve 30 slides. Furthermore, the passage opening 24 can be closed when the valve 30 slides downward, and after the passage opening 24 is closed, the O-ring 34 of the valve 30 is contacted with a plane 26 of the valve seat 22 for sealing the passage opening 24. On the contrary, when the valve 30 slides upward, the passage opening 24 is opened to make the wafer pass through the passage opening 24. Nevertheless, when the valve 30 slides upward or downward, the second surface 30b will rub against a side surface 28a of each metal sheet 28 frequently, which leads to producing particles. Since the gate valve assembly 20 is installed in the CVD apparatus 10, the produced particles will contaminate the inside of the CVD apparatus 10 and further influence a quality of the semiconductor process. Additionally, the polymer glue 36 is always corroded by a corrosive gas used in a CVD process, and therefore, the gap between the O-ring 34 and the sidewalls of the groove 32 is exposed. That would cause the valve 30 to be unable to seal the passage opening 24 completely, and thus, a vacuum level of the CVD apparatus 10 cannot be effectively maintained.

SUMMARY OF INVENTION

It is therefore a primary objective of the claimed invention to provide a gate valve assembly to solve the above-mentioned problem.

According to the claimed invention, a gate valve assembly including a valve seat and a valve is provided. The valve seat includes a passage opening and a contacting region surrounding the passage opening. The valve includes a groove located on a marginal region of the valve, and a sealing body positioned in the groove. The passage opening is closed by covering the valve over the valve seat, and an upper surface of the sealing body is tightly contacted with the contacting region. Therefore, the valve is prevented from rubbing against the valve seat and producing particles.

It is an advantage over the prior art that the passage opening in the claimed invention is closed by covering the valve over the valve seat, so that the valve is prevented from rubbing against the valve seat and producing particles. Furthermore, the sealing body can be tightly clamped in the groove for improving an airtightness of the gate valve assembly.

These and other objectives of the present invention will no doubt become obvious to those of ordinary skill in the art after reading the following detailed description of the preferred embodiment, which is illustrated in the multiple figures and drawings.

DETAILED DESCRIPTION

Figure 1:
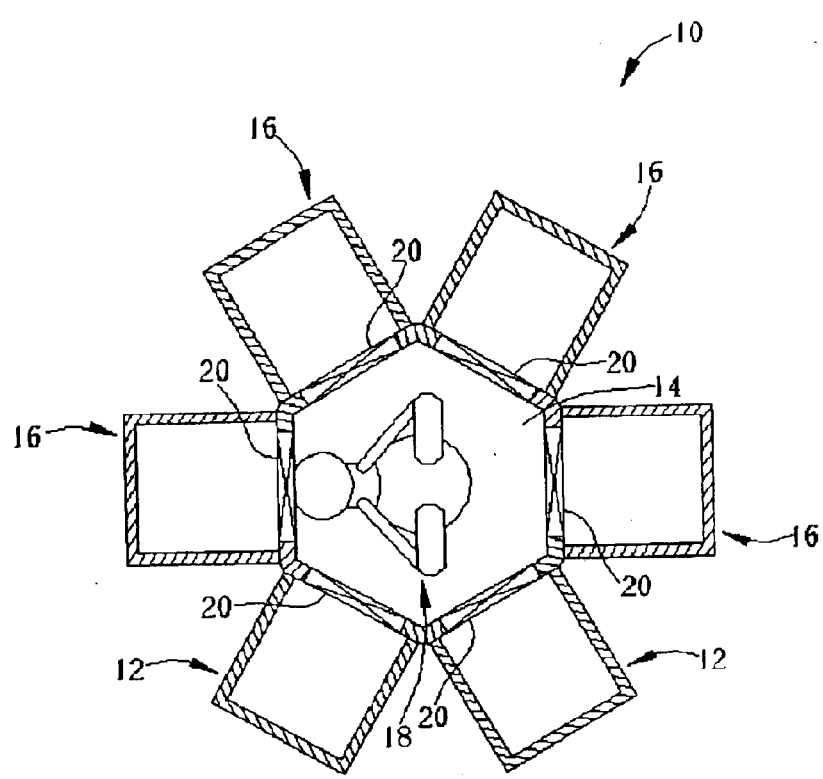
FIG. 1 is a schematic diagram of a chemical vapor deposition (CVD) apparatus.
Figure 2:
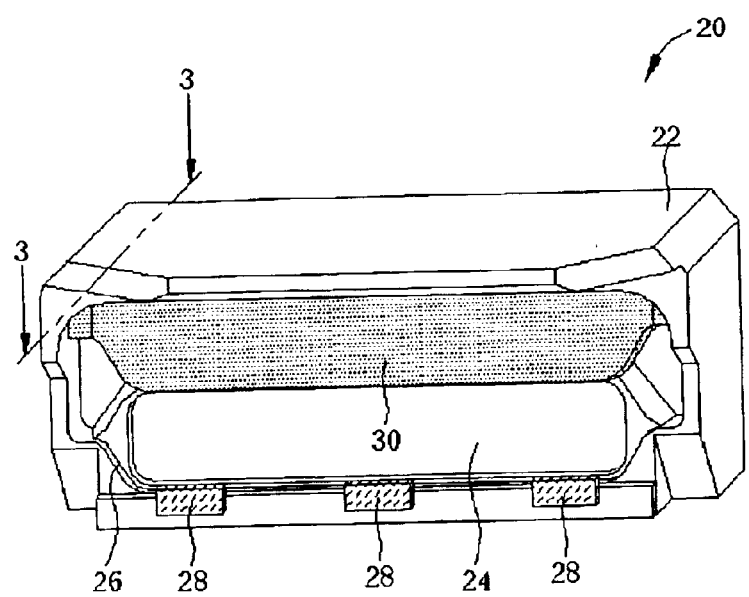
FIG. 2 is a schematic diagram of a prior art gate valve assembly.
Figure 3:
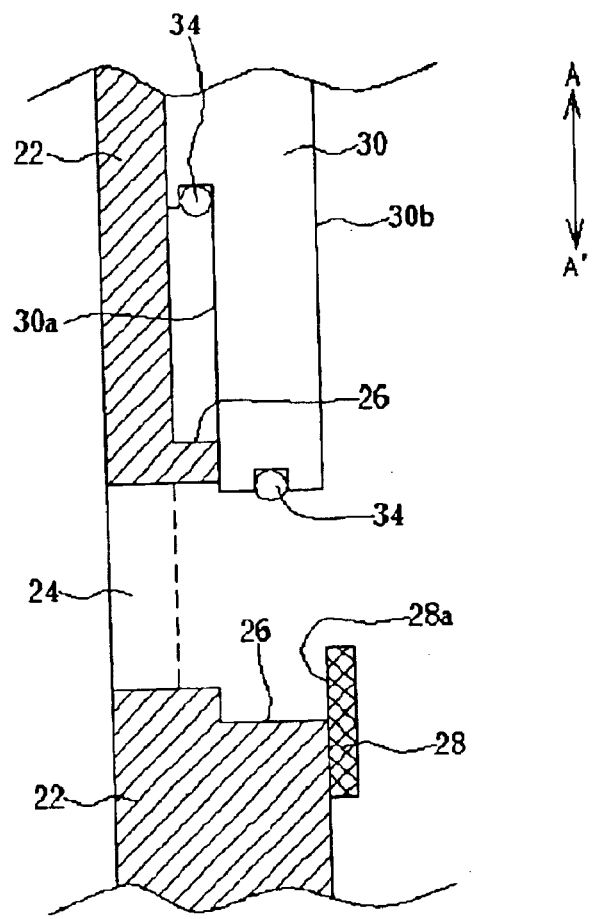
FIG. 3 is a cross-sectional view along line 3—3 of FIG. 2.
Figure 4:
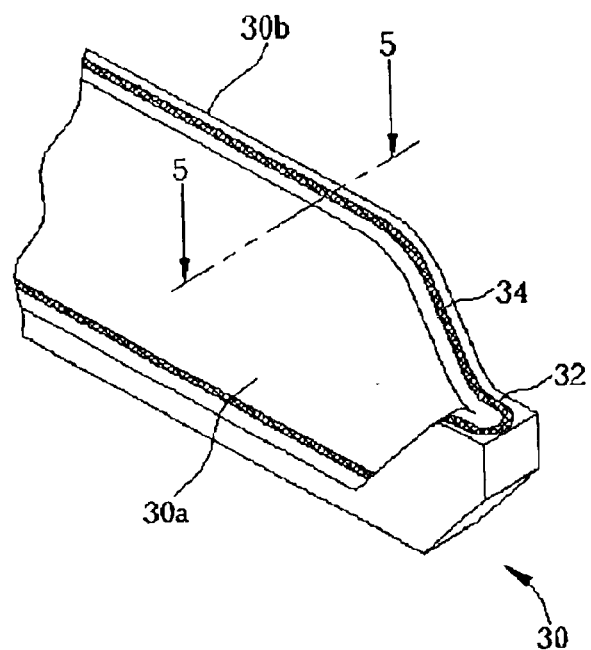
FIG. 4 is a perspective view of the gate valve assembly shown in FIG. 2.
Figure 5:
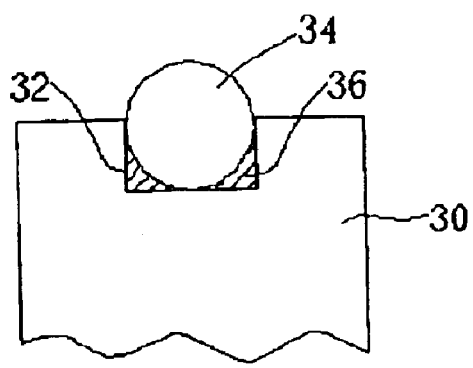
FIG. 5 is a cross-sectional view along line 5—5 of FIG. 4.
Figure 6:
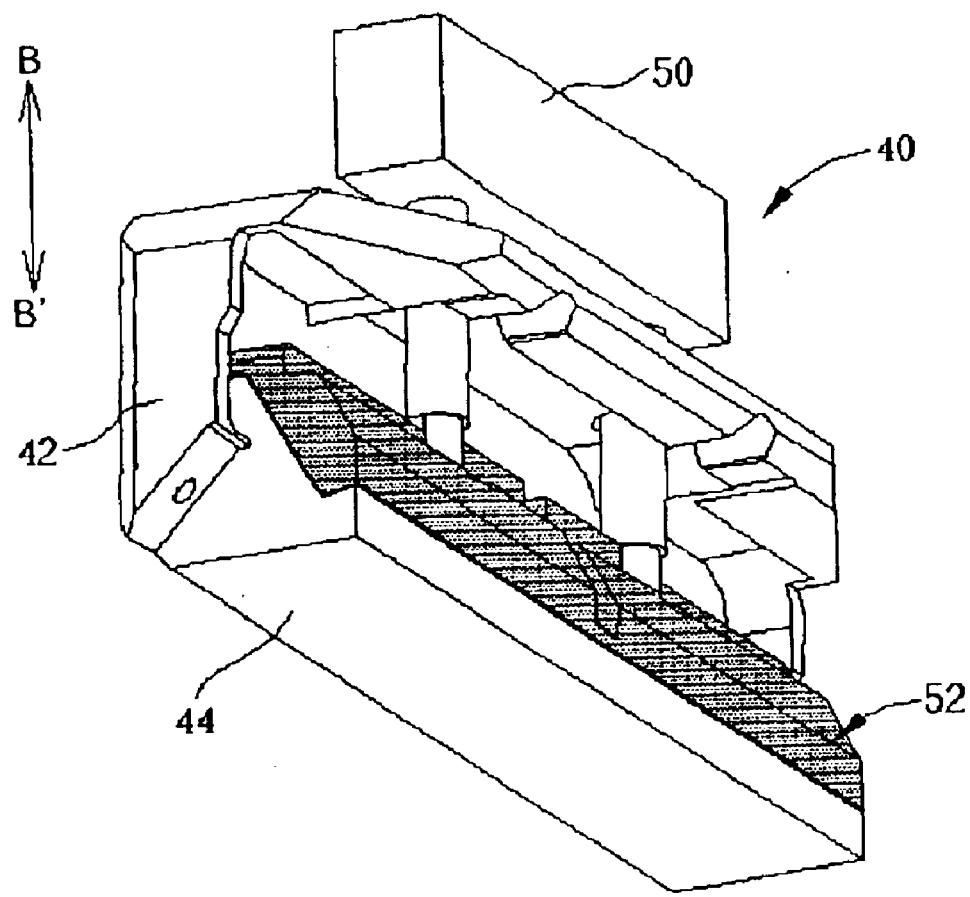
FIG. 6 is gate valve assembly according to the preferred embodiment of the present invention.

Please refer to FIG. 6. FIG. 6 is gate valve assembly according to the preferred embodiment of the present invention. As shown in FIG. 6, a gate valve assembly 40 comprises a housing 42, a valve seat 44 joined to a bottom of the housing 42, a pneumatic cylinder 50 installed on the top of the housing 42, and a valve 52 that is driven by the pneumatic cylinder 50. In the preferred embodiment of the present invention, the housing 42, the valve seat 44, and the valve 52 are all made of an aluminum alloy.

Figure 7A:
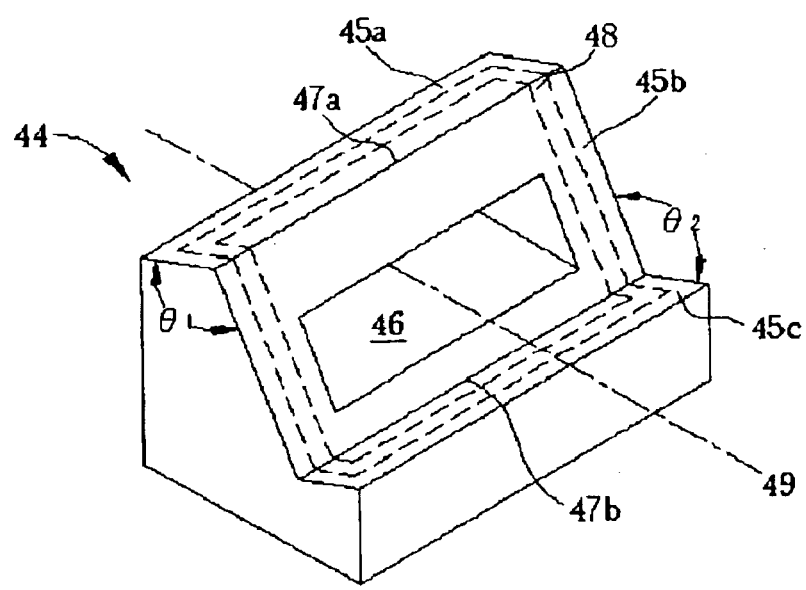
FIG. 7(A) is a perspective view of a valve seat shown in FIG. 6.
Figure 7B:
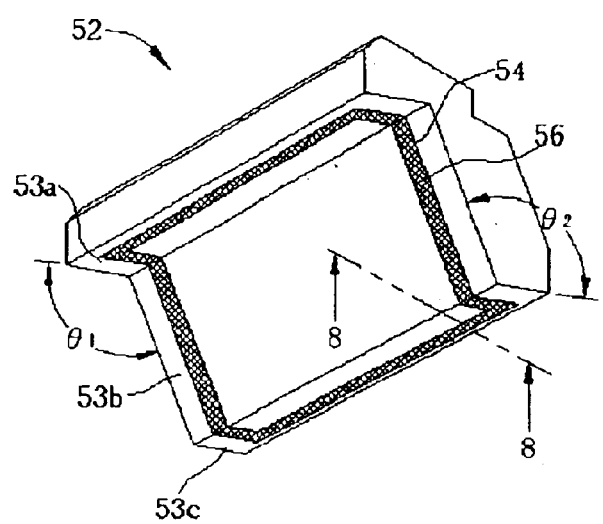
FIG. 7(B) is a perspective view of the valve shown in FIG. 6.
Figure 7C:
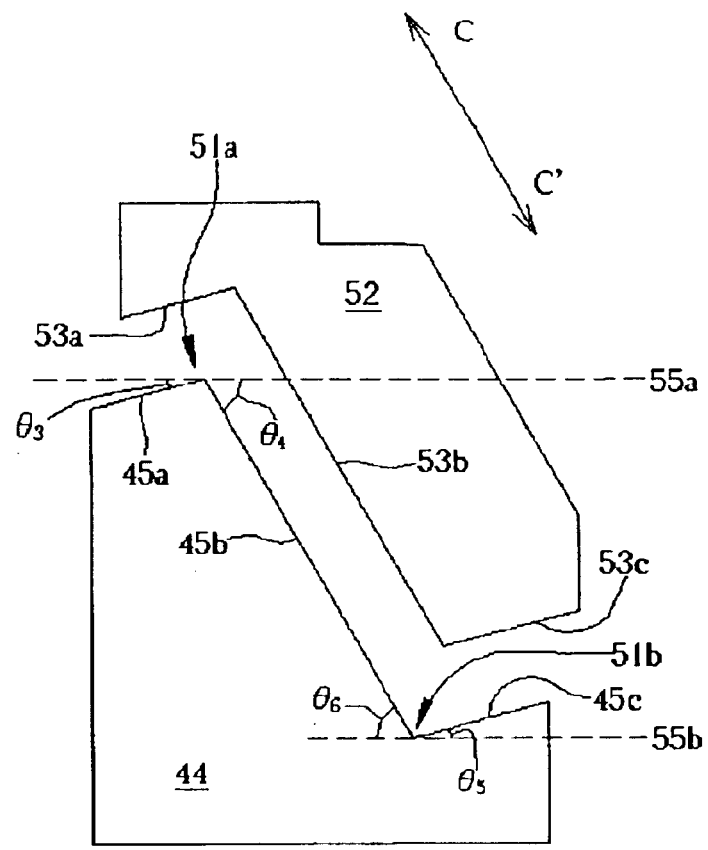
FIG. 7(C) is a side view of the valve and the valve seat shown in FIG. 6.

Please refer to FIG. 7(A) to FIG. 7(C). FIG. 7(A) is a perspective view of the valve seat shown in FIG. 6, FIG. 7(B) is a perspective view of the valve shown in FIG. 6, and FIG. 7(C) is a side view of the valve and the valve seat shown in FIG. 6. As shown in FIG. 7(A), the valve seat 44 comprises an upper portion 45a, a lower portion 45c, and a middle portion 45b located between the upper portion 45a and the lower portion 45c. Additionally, a sealing surface is made up of the upper portion 45a, the middle portion 45b, and the lower portion 45c. On one hand, the upper portion 45a and the middle portion 45b are connected by a protruded section, and more specifically, the upper portion 45a and the middle portion 45b intersect to form a straight line 47a that is protruded outwardly and the intersecting angle $\theta_1$ is an obtuse angle. On the other hand, the lower portion 45c and the middle portion 45b are connected by a concaved section. Moreover, the lower portion 45c and the middle portion 45b intersect to form a straight line 47b that is indented inwardly and their intersecting angle $\theta_2$ is an obtuse angle. In addition, the valve seat 44 further comprises a passage opening 46 for permitting a wafer to pass through the valve seat 44 and a contacting region 48 surrounding the passage opening 46. Noticeably, a central axis 49 of the passage opening 46 and the straight lines 47a, 47b are parallel with each other, as will be explained below.

As shown in FIG. 7(B), the valve 52 comprises an upper portion 53a, a lower portion 53c, and a middle portion 53b connected between the upper portion 53a and the lower portion 53c. An intersecting angle between the upper portion 53a and the middle portion 53b is equal to $\theta_1$, which is the same as that between the upper portion 45a and the middle portion 45b. Likewise, an intersecting angle between the lower portion 53c and the middle portion 53b is equal to $\theta_2$, which is the same as that between the lower portion 45c and the middle portion 45b. Furthermore, the valve 52 comprises a groove 54 located on a marginal region of the valve 52 and a sealing body 56 inserted in the groove 54 in a removable way.

Referring to FIG. 7(C), a horizontal plane 55a comprises the straight line 47a, while a horizontal plane 55b that does not intersect with the horizontal plane 55a comprises the straight line 47b. As shown in FIG. 7(C), an angle $\theta_3$ between the upper portion 45a and the horizontal plane 55a is an acute angle, while an angle $\theta_4$ between the middle portion 45b and the horizontal plane 55a is also an acute angle. Therefore, a protruded section 51a is formed to connect the upper portion 45a with the middle portion 45b. Additionally, an angle $\theta_5$ between the lower portion 45c and the horizontal plane 55b is an acute angle, and an angle $\theta_6$ between the middle portion 45b and the horizontal plane 55b is also an acute angle, so that a concaved section 51b is formed to connect the lower portion 45c with the middle portion 45b. Noticeably, when the valve 52 is covered over the valve seat 44, the protruded section 51a and the concaved section 51b function to orient the valve 52, or to accurately guide the valve 52 to a proper position on the valve seat 44, and prevent the valve 52 from sliding along a direction indicating as a double arrow CC". In other words, even though the gate valve assembly 40 in the present invention is not equipped with any other alignment device, the valve 52 can still be precisely covered over the valve seat 44. In the preferred embodiment of the present invention, the angles $\theta_3$ and $\theta_5$ are both approximately equal to 15°, and the angles $\theta_4$ and $\theta_6$ are both approximately equal to 35°.

Figure 8A:
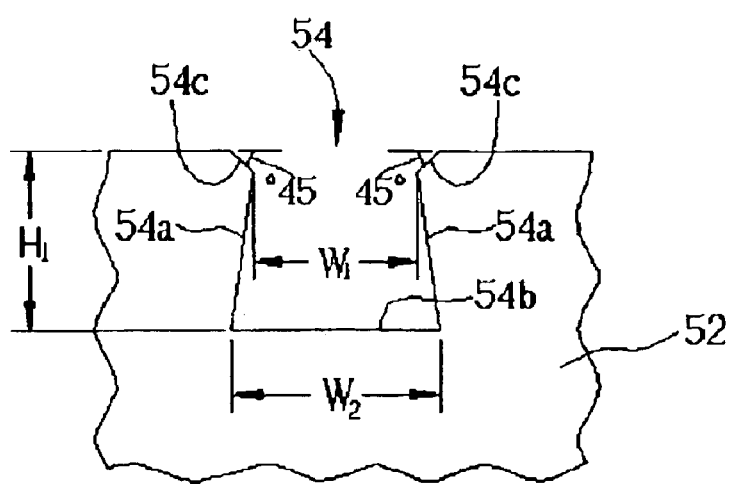
FIG. 8(A) is a cross-sectional view along line 8—8 of a groove shown in FIG. 7(B).
Figure 8B:
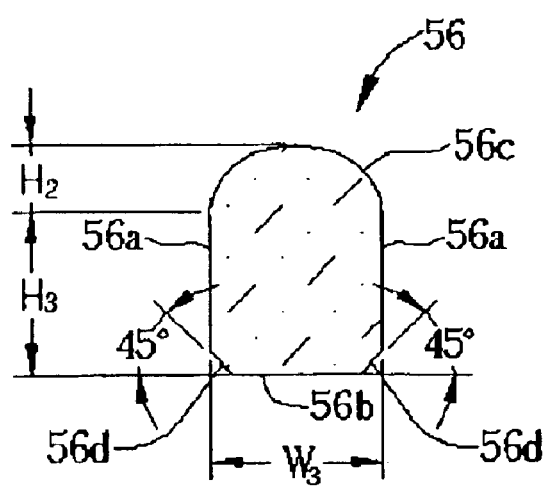
FIG. 8(B) is a cross-sectional view along line 8—8 of a sealing body shown in FIG. 7 (B).
Figure 8C:
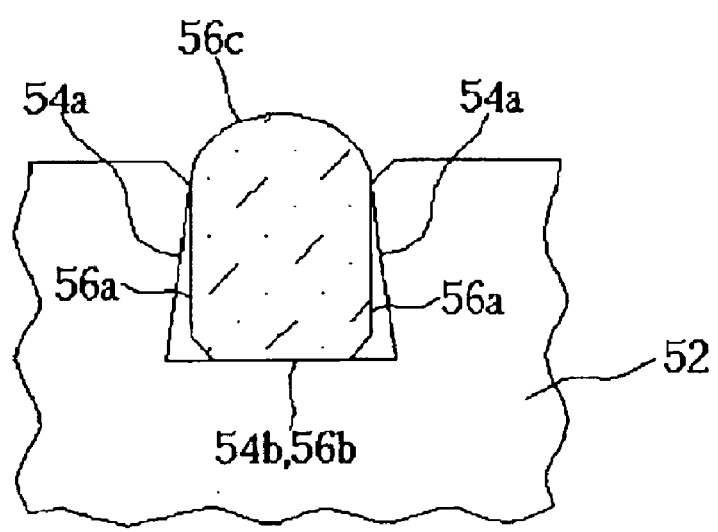
FIG. 8(C) is a cross-sectional view along line 8—8 of the valve shown in FIG. 7(B).

Referring to FIG. 8(A) to FIG. 8(C), the detailed structures of the valve 52 are described as follows. FIG. 8(A) is a cross-sectional view along line 8—8 of the groove shown in FIG. 7(B), FIG. 8(B) is a cross-sectional view along line 8—8 of the sealing body shown in FIG. 7(B), and FIG. 8(C) is a cross-sectional view along line 8—8 of the valve shown in FIG. 7(B). As shown in FIG. 8(A), the groove 54 comprises two sidewalls 54a, and a bottom 54b connected between the two sidewalls 54a. Additionally, the groove 54 further comprises two tangent planes 54c located near an opening of the groove 54, and an angle between the bottom 54b of the groove and each of the tangent planes 54c is approximately equal to 45°. Furthermore, a width $W_1$ of the opening of the groove 54 is smaller than a width $W_2$ of the bottom 54b of the groove 54 for forming a trapezoid cross-section of the groove 54. In the preferred embodiment of the present invention, a depth $H_1$ of the groove 54 is equal to 4 mm, the width $W_1$ of the opening of the groove 54 is equal to 4.98 mm, and the width $W_2$ of the bottom 54b of the groove 54 is equal to 6 mm.

As shown in FIG. 8(B), a sealing body 56 includes two side planes 56a, a bottom plane 56b, and an arc-shaped upper surface 56c. Importantly, a width $W_3$ of the bottom plane 56b of the sealing body 56 has to be smaller than the width $W_2$ of the bottom 54b of the groove 54 in order to prolong a life of the sealing body 56. In addition, the sealing body 56 further comprises two lateral tangent planes 56d, and an angle between the bottom plane 56b and each of the lateral tangent planes 56d is approximately equal to 45°. In the preferred embodiment of the present invention, the upper surface 56c is one third of a sphere, a height $H_2$ of the upper surface 56c is equal to 2 mm, a height $H_3$ of the side plane 56a is equal to 4 mm, and a width $W_3$ of the bottom plane 56b is equal to 5 mm. Generally, the sealing body 56 can be called as an O-ring and is composed of rubber materials.

Referring to FIG. 8(C), after the sealing body 56 is inserted in the groove 54, the bottom plane 56b of the sealing body 56 is contacted with the bottom 54b of the groove 54 and the upper surface 56c of the sealing body 56 is exposed outside the groove 54. What is more, the advantages of the valve seat 44 and the valve 52 designed according to the present invention will be described in detail as follows. First, the sealing body 56 shown in FIG. 8(B) includes two lateral tangent planes 56d, so that the sealing body 56 can be easily inserted into the groove 54 and it takes less time to install the sealing body 56 into the groove 54. Second, the width $W_2$ of the opening of the groove 54 has to be smaller than the width $W_2$ of the bottom 54b of the groove 54, so that the sealing body 56 is tightly clamped in the groove 54 and is unable to drop from the groove 54. That is to say, even though the groove 54 of FIG. 8 (C) is reversed, the sealing body 56 will not fall from the groove 54 and it is easy to pump air from the chambers to form a vacuum. Additionally, because the width $W_2$ of the bottom 54b of the groove 54 must be larger than the width $W_3$ of the bottom plane 56b of the sealing body 56, an extendable space in the groove 54 is provided for the sealing body 56 to prevent the sealing body 56 from being deformed due to long-term compression. As a result, the life of the sealing body 56 is prolonged and a frequency for replacing the sealing body 56 is effectively decreased, which would reduce a production cost.

Figure 9:
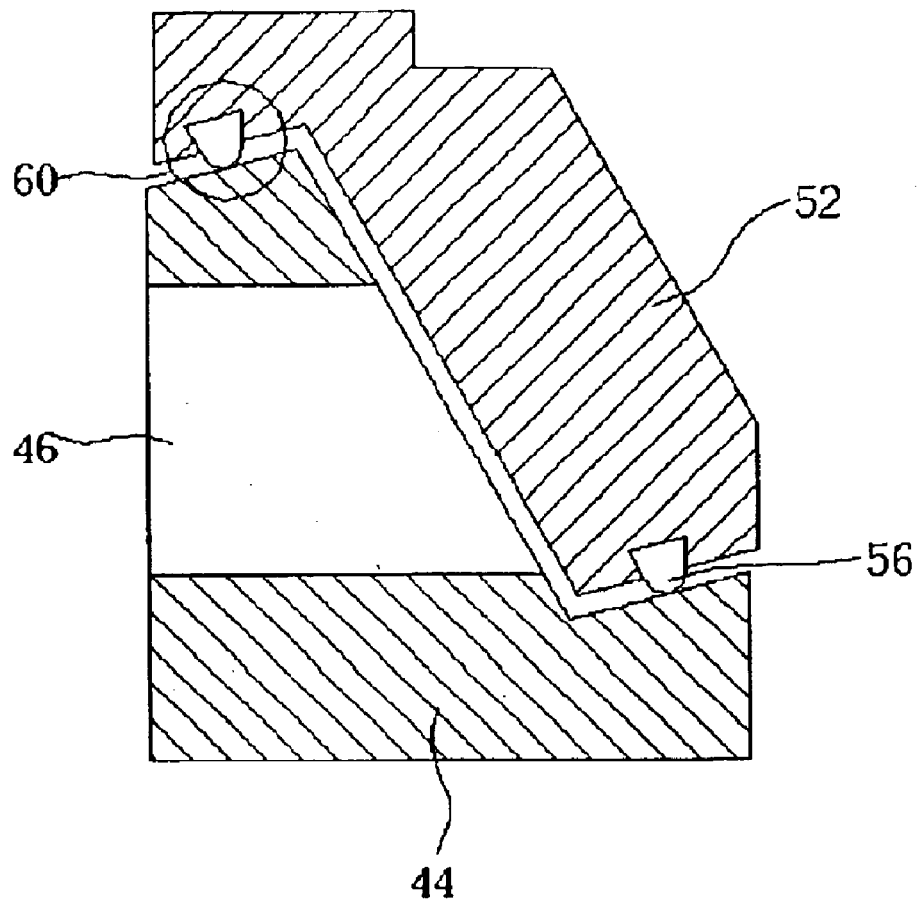
FIG. 9 is a cross-sectional view of the gate valve assembly of FIG. 6 in a closing state.
Figure 10A:
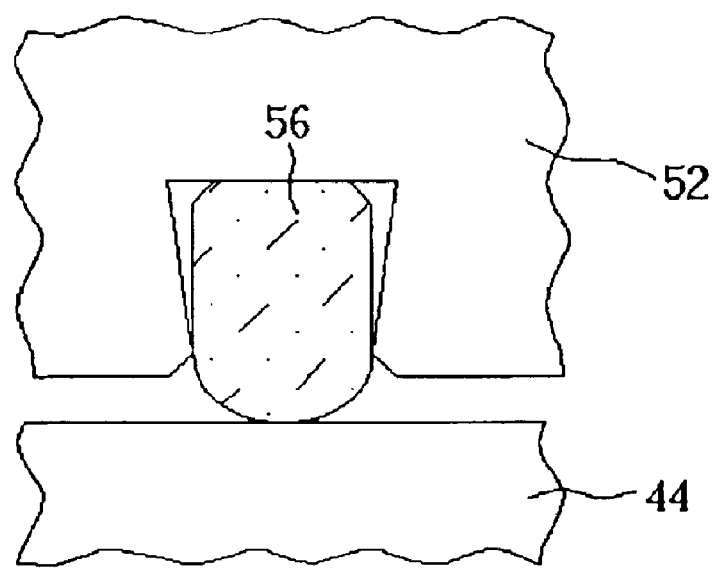
FIG. 10(A) and FIG. 10(B) are enlarged diagrams of a circle of FIG. 9.
Figure 10B:
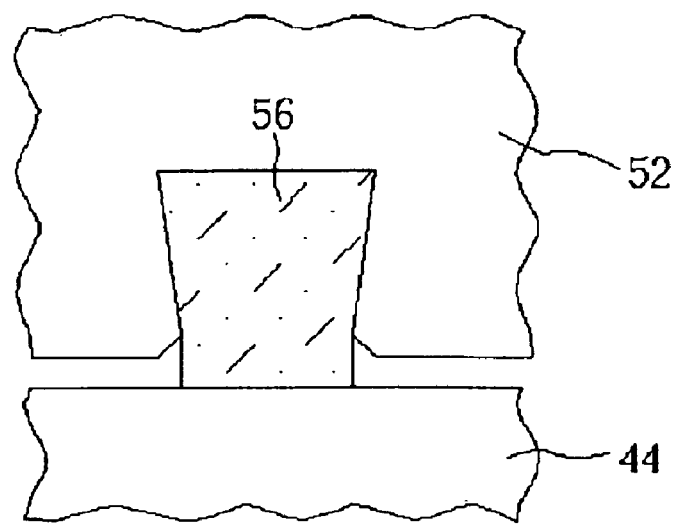

Referring to FIG. 6 and FIG. 9, the operation manner will be explained as follows. FIG. 9 is a cross-sectional view of the gate valve assembly of FIG. 6 in a closing state. As shown in FIG. 6, when closing the passage opening 46 of the valve seat 44, the pneumatic cylinder 50 drives the valve 52 to slide downward along the double arrow BB" to cover the valve seat 44. At the same time, the upper surface 56c of the sealing body 56 is tightly contacted with the contacting region 48 on the valve seat 44 in order to seal the passage opening 46 completely, as shown in FIG. 9. On the contrary, when the valve 52 slides upward along the double arrow BB", the passage opening 46 will be opened. Please refer to FIG. 10(A) and FIG. 10(B). FIG. 10(A) and FIG. 10(B) are enlarged diagrams of a circle 60 shown in FIG. 9. As shown in FIG. 10(A) and FIG. 10(B), when the valve 52 slides downward along the double arrow BB" to cover the valve seat 44, a point contact (FIG. 10(A)) is firstly appeared between the upper surface 56c of the sealing body 56 and the contacting region 48 on the valve seat 44, and then, the point contact is changed into a surface contact (FIG. 10(B)). Because the groove 54 has two tangent planes 54c located near the opening of the groove 54, the upper surface 56c of the sealing body 56 can be prevented from rubbing against rims of the groove's opening after the upper surface 56c contacts with the contacting region 48. Therefore, the sealing body 56 is prevented from being damaged and producing particles to contaminate the inside of an apparatus. Moreover, as shown in FIG. 10(B), after the valve 52 closes the passage opening 46 completely, the two side planes 56a of the sealing body 56 are respectively contacted with the two sidewalls 54a of the groove 54 tightly. Since the sealing body 56 in the present invention comprises three flat planes 56a, 56a, and 56b, the sealing body 56 can be tightly contacted with the sidewalls 54a and the bottom 54b of the groove 54 without producing any gap between the sealing body 56 and the groove 54.

Noticeably, the passage opening 46 in the present invention is closed by covering the valve 52 over the valve seat 44, so that the valve 52 is prevented from rubbing against the valve seat 44 and producing particles to contaminate the inside of an apparatus. Furthermore, the sliding direction of the valve 52 is not limited to the direction indicating as the double arrow BB" of FIG. 6. That is to say, the valve 52 can slide along any other sliding direction, as is known to those skilled in the art. In addition, the gate valve assembly 40 in the present invention can be installed in any kinds of semiconductor apparatus, such as a physical vapor deposition apparatus, or an etcher.

Compared to the prior art, the passage opening 46 in the present invention is closed by covering the valve 52 over the valve seat 44, so that the valve 52 is prevented from rubbing against the valve seat 44 and producing particles to contaminate the inside of an apparatus. Additionally, a protruded section 51a is formed to connect the upper portion 45a with the middle portion 45b and a concaved section 51b is formed to connect the lower portion 45c with the middle portion 45b. Therefore, when the valve 52 is about to cover the valve seat 44, the protruded section 51a and the concaved section 51b function to orient the valve 52 and prevent the valve 52 from sliding. The sealing body 56 includes two lateral tangent planes 56d, so that the sealing body 56 can be easily inserted into the groove 54. Moreover, the groove 54 has a trapezoid cross-section, and thus, the sealing body 56 is tightly clamped in the groove 54. Furthermore, the width $W_2$ of the bottom 54b of the groove 54 is larger than the width $W_3$ of the bottom plane 56b of the sealing body 56 for providing an extendable space for the sealing body 56 to prevent the sealing body 56 from being deformed due to long-term compression. Because the groove 54 has two tangent planes 54c located near the opening of the groove 54, the upper surface 56c of the sealing body 56 can be prevented from rubbing against rims of the groove's opening after the upper surface 56c contacts with the contacting region 48. Therefore, the sealing body 56 is prevented from being damaged and producing particles to contaminate the inside of an apparatus.

Those skilled in the art will readily observe that numerous modifications and alterations of the device may be made while retaining the teachings of the invention. Accordingly, the above disclosure should be construed as limited only by the metes and bound of the appended claims.

What is claimed is:

1. A covered-type gate valve assembly comprising:
   a valve seat having a passage opening and a contacting region surrounding the passage opening; and
   a valve for closing the passage opening comprising:
      a groove located on a marginal region of the valve, the groove having two sidewalls and a bottom connected between the two sidewalls; and
      a sealing body inserted in the groove, the sealing body having an arc-shaped upper surface exposed outside the groove, a bottom plane contacted with the bottom of the groove, and two side planes;
   wherein the passage opening is closed by covering the valve seat with the valve, and after the passage opening is closed, the upper surface of the sealing body is tightly contacted with the contacting region, and the two side planes of the sealing body are respectively contacted with the two sidewalls of the groove tightly for preventing the valve from rubbing against the valve seat and producing particles.

2. The gate valve assembly of claim 1 wherein a width of an opening of the groove is smaller than a width of the bottom of the groove for tightly clamping the sealing body in the groove.

3. The gate valve assembly of claim 1 wherein a width of the bottom of the groove is larger than a width the bottom plane of the sealing body for providing an extendable space for the sealing body to prevent the sealing body from being deformed due to long-term compression.

4. The gate valve assembly of claim 1 wherein the sealing body is inserted in the groove in a removable way.

5. The gate valve assembly of claim 1 wherein the groove further comprises two tangent planes located near an opening of the groove, and an angle between the bottom of the groove and each of the two tangent planes is approximately equal to 45° for preventing the upper surface of the sealing body from rubbing against rims of the groove's opening.

6. The gate valve assembly of claim 5 wherein the sealing body further comprises two lateral tangent planes, each of the lateral tangent planes connecting the bottom plane with one of the side planes of the sealing body, and an angle between the bottom plane and each of the lateral tangent planes is approximately equal to 45° for easily inserting the sealing body into the groove.

7. The gate valve assembly of claim 1 wherein the valve seat further comprises a sealing surface surrounding the passage opening having an upper portion, a lower portion, and a middle portion located between the upper portion and the lower portion, and the contacting region is located in the sealing surface.

8. The gate valve assembly of claim 7 wherein the upper portion and the middle portion are connected by a protruded section, while the lower portion and the middle portion are connected by a concaved section.

9. The gate valve assembly of claim 8 wherein when the valve is covered over the valve seat, the protruded section and the concaved section are both utilized to orient the valve.

10. The gate valve assembly of claim 9 wherein after the valve is covered over the valve seat, the protruded section and the concaved section are both utilized to prevent the valve from sliding.

11. A covered-type gate valve assembly comprising:
a valve seat having a passage opening, and a sealing surface surrounding the passage opening having an upper portion, a lower portion, and a middle portion that is connected to the upper portion by a protruded section and is connected to the lower portion by a concaved section; and
a valve for closing the passage opening comprising a groove located on a marginal region of the valve, and a sealing body inserted in the groove;
wherein when the valve is covered over the valve seat, the protruded section and the concaved section function to orient the valve, and after the valve is covered over the valve seat, the sealing body is tightly contacted with the sealing surface for preventing the valve from rubbing against the valve seat and producing particles.

12. The gate valve assembly of claim 11 wherein the groove comprises two sidewalls and a bottom connected between the two sidewalls.

13. The gate valve assembly of claim 11 wherein the sealing body has an arc-shaped upper surface, a bottom plane, and two side planes.

14. The gate valve assembly of claim 13 wherein when the sealing body is installed into the groove, the bottom plane of the sealing body is contacted with the bottom of the groove, and the upper surface of the sealing body is exposed outside the groove.

15. The gate valve assembly of claim 13 wherein the sealing surface comprises a contacting region surrounding the passage opening, and when the passage opening is closed, the upper surface of the sealing body is tightly contacted with the contacting region, and the two side planes of the sealing body are respectively contacted with the sidewalls of the groove tightly.

16. A semiconductor apparatus comprising:
a vacuum chamber;
a gate valve assembly installed on the vacuum chamber for opening or closing the vacuum chamber, the gate valve assembly comprising:
a valve seat having a passage opening for allowing a wafer to pass in and out of the vacuum chamber, and a sealing surface surrounding the passage opening having an upper portion, a lower portion, and a middle portion that is connected to the upper portion by a protruded section and is connected to the lower portion by a concaved section; and
a valve comprising:
a groove located on a marginal region of the valve having two sidewalls and a bottom connected between the two sidewalls; and
a sealing body inserted in the groove having an arc-shaped upper surface exposed outside the groove, a bottom plane contacted with the bottom of the groove, and two side planes;
wherein when the valve is covered over the valve seat, the protruded section and the concaved section function to orient the valve, and after the valve is covered over the valve seat, the upper surface of the sealing body is tightly contacted with the contacting region, and the two side planes of the sealing body are respectively contacted with the two sidewalls of the groove tightly for maintaining a vacuum level of the vacuum chamber.

17. The semiconductor apparatus of claim 16 wherein a width of an opening of the groove is smaller than a width of the bottom of the groove for tightly clamping the sealing body in the groove.

18. The semiconductor apparatus of claim 16 wherein a width of the bottom of the groove is larger than a width the bottom plane of the sealing body for providing an extendable space for the sealing body to prevent the sealing body from being deformed due to long-term compression.

19. The semiconductor apparatus of claim 16 wherein the groove further comprises two tangent planes located near an opening of the groove, and an angle between the bottom of the groove and each of the two tangent planes is approximately equal to 45° for preventing the upper surface of the sealing body from rubbing against rims of the groove's opening.

20. The semiconductor apparatus of claim 19 wherein the sealing body further comprises two lateral tangent planes, each of the lateral tangent planes connecting the bottom plane with one of the side planes of the sealing body, and an angle between the bottom plane and each of the lateral tangent planes is approximately equal to 45° for easily inserting the sealing body into the groove.

21. The semiconductor apparatus of claim 16 wherein the semiconductor apparatus comprises a chemical vapor deposition apparatus, a physical vapor deposition apparatus, or an etcher.

* * * * *